United States Patent

Mao

[11] Patent Number: 6,041,895
[45] Date of Patent: Mar. 28, 2000

[54] HANDLEBAR BRAKE ASSEMBLY FOR BICYCLES

[76] Inventor: Chen Shou Mao, 344, Section 1, Chung Shan Road Tah-Cha Township, Taichung Hsien, Taiwan

[21] Appl. No.: 09/070,030

[22] Filed: Apr. 30, 1998

[51] Int. Cl.[7] .................................................. G05G 11/00
[52] U.S. Cl. ........................................... 188/24.22; 74/489
[58] Field of Search ................. 188/24.22, 2 D; 74/489, 502.2, 502.4, 504, 506

[56] References Cited

U.S. PATENT DOCUMENTS

| | | | |
|---|---|---|---|
| 1,716,141 | 6/1929 | Knight | 74/489 |
| 1,834,724 | 12/1931 | Nisbet | 74/489 |
| 5,666,858 | 9/1997 | Von Der Osten-Sacken et al. | 74/489 |

*Primary Examiner*—Matthew C. Graham
*Attorney, Agent, or Firm*—Harrison & Egbert

[57] ABSTRACT

A bicycle brake assembly is composed of a rotary handlebar having a grip tube. The grip tube is provided in the inner wall thereof with a protruded block capable of being actuated to trigger the bicycle brake cable at such time when the rotary handlebar is rotated. The bicycle brake assembly is further composed of an elastic ring for providing the rotary handlebar with an elastic force capable of causing the rotary handlebar to return to its original position after being rotated.

1 Claim, 8 Drawing Sheets

HANDLEBAR BRAKE ASSEMBLY FOR BICYCLES

FIELD OF THE INVENTION

The present invention relates generally to a bicycle, and more particularly to a brake lever of the bicycle.

BACKGROUND OF THE INVENTION

As shown in FIG. 1, a prior art bicycle handlebar 1 is provided with a brake lever 2 fastened therewith. When a bicyclist is riding the bicycle, his or her hands hold the handlebar 1 such that one or two fingers remain in contact with the brake lever 2 so as to be ready to apply the brake whenever it is necessary. However, it is often inconvenient to hold the handlebar 1 and the brake lever 2, especially for those who have small hands.

SUMMARY OF THE INVENTION

The primary objective of the present invention is to provide a bicycle with a brake assembly free from the drawbacks of the prior art bicycle brake lever described above.

The foregoing objective of the present invention is attained by a bicycle brake assembly which is incorporated into the bicycle handlebar such that the brake cable is linked with a protruded block located in the inner wall of the handlebar, and that the brake cable is triggered by the rotational motion of the handlebar.

The foregoing objective, features, functions, and advantages of the present invention will be more readily understood upon a thoughtful deliberation of the following detailed description of a preferred embodiment of the present invention with reference to the accompanying drawings.

DETAILED DESCRIPTION OF THE EMBODIMENT

Figure 1:
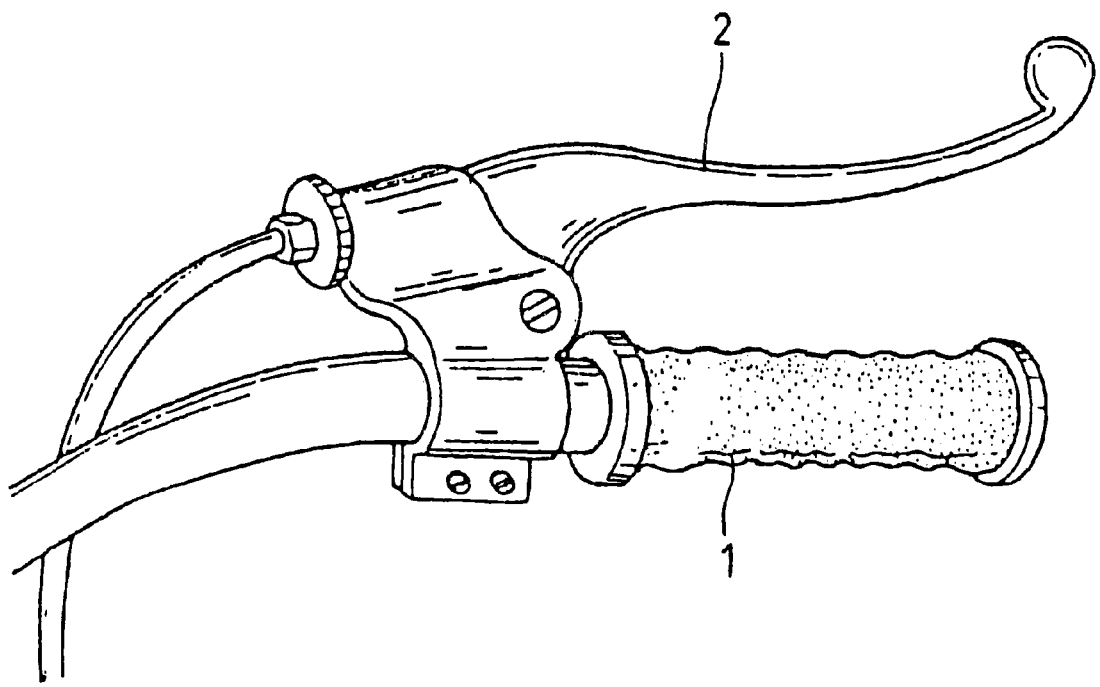
FIG. 1 shows a perspective view of a prior art bicycle brake lever.
Figure 2:
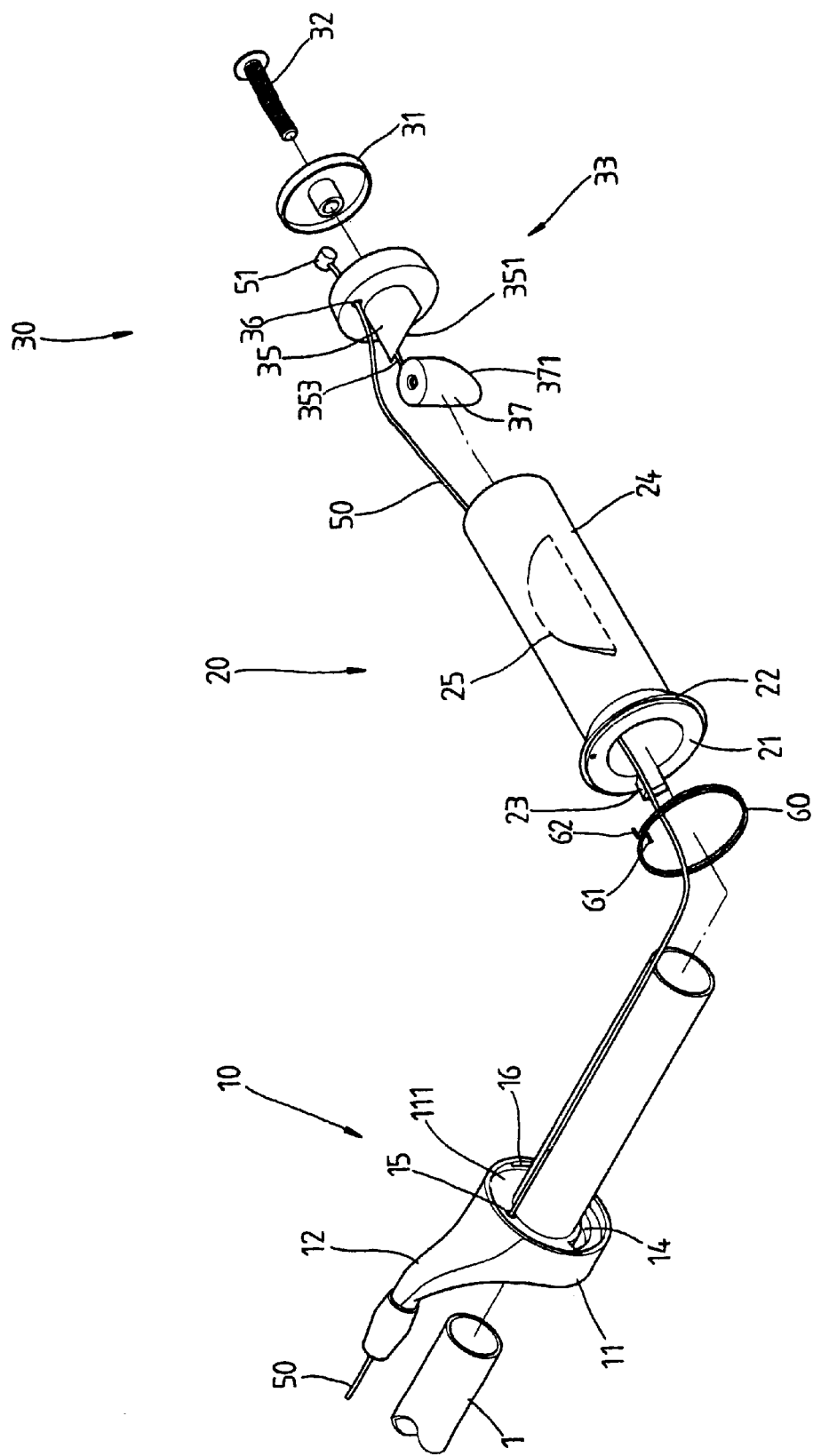
FIG. 2 shows an exploded view of a bicycle brake lever of the present invention.
Figure 3:
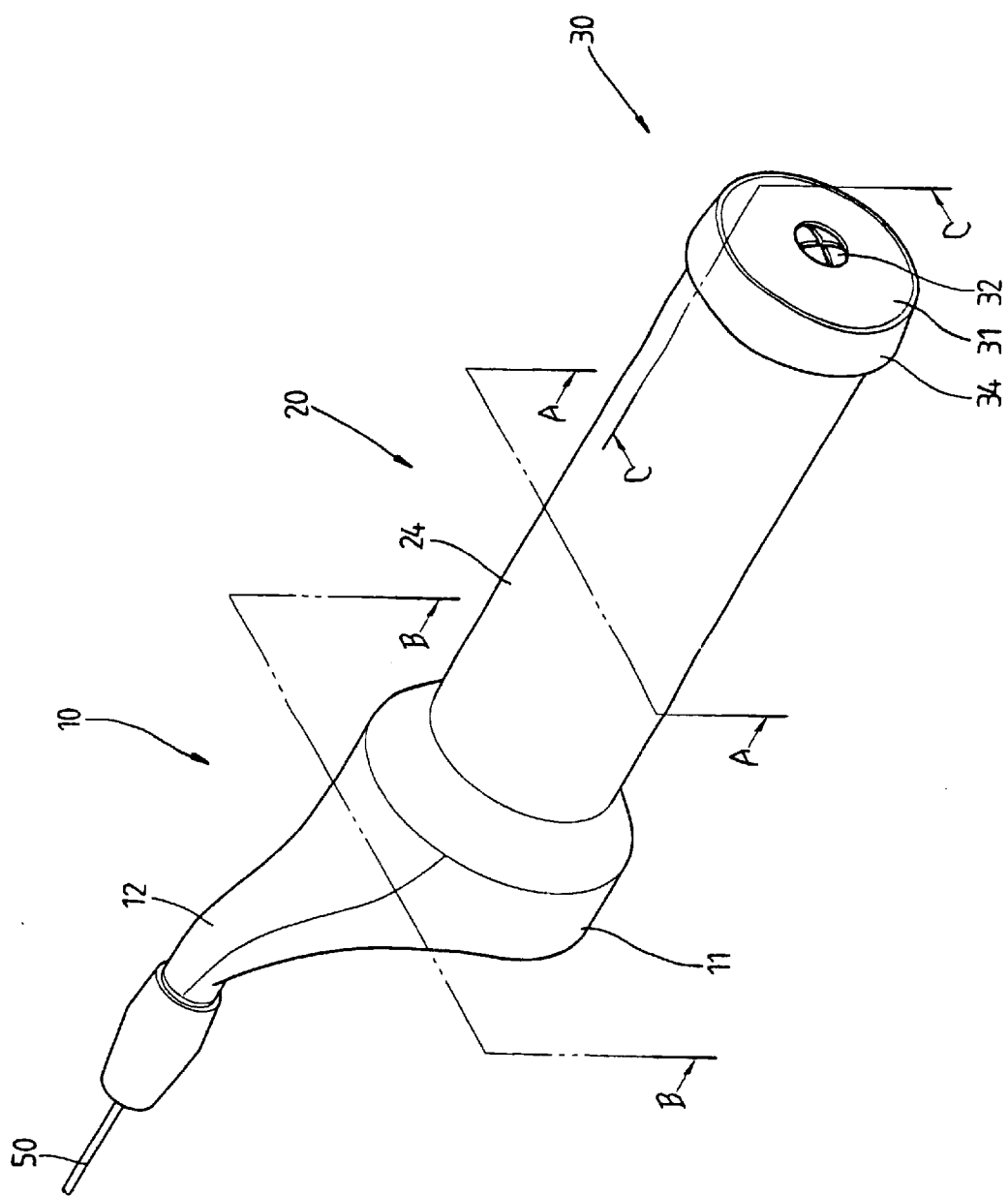
FIG. 3 shows a perspective view of the bicycle brake assembly of the present invention in combination.
Figure 4:
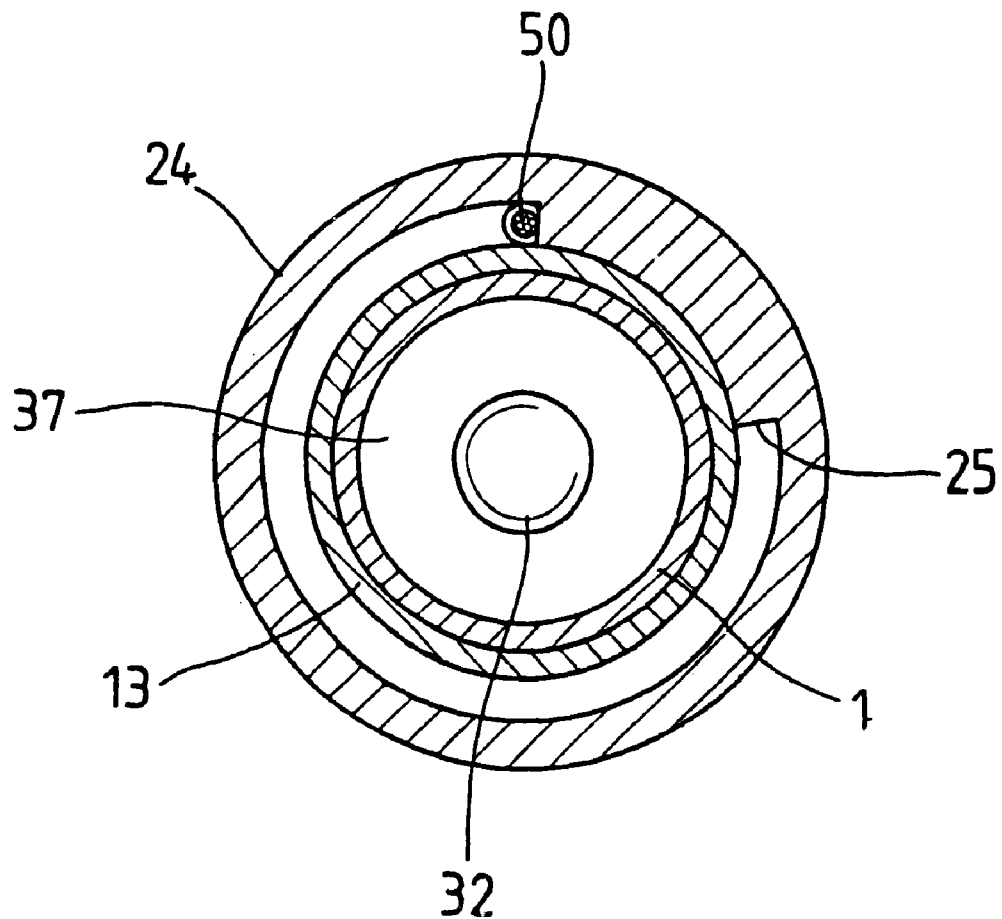
FIG. 4 shows a sectional view of a portion taken along the direction indicated by a line A—A as shown in FIG. 3.
Figure 5:
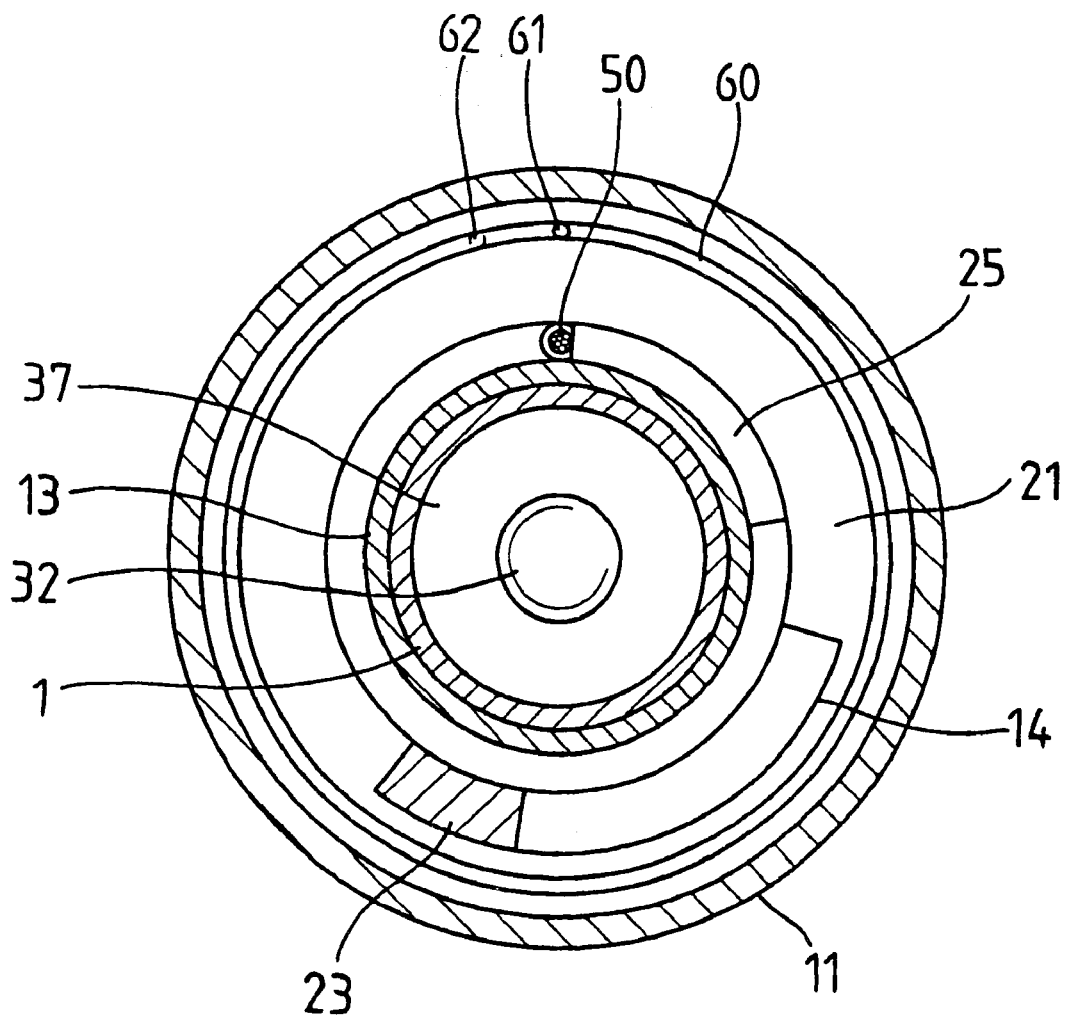
FIG. 5 shows a sectional view of a portion taken along the direction indicated by a line B—B as shown in FIG. 3.
Figure 6:
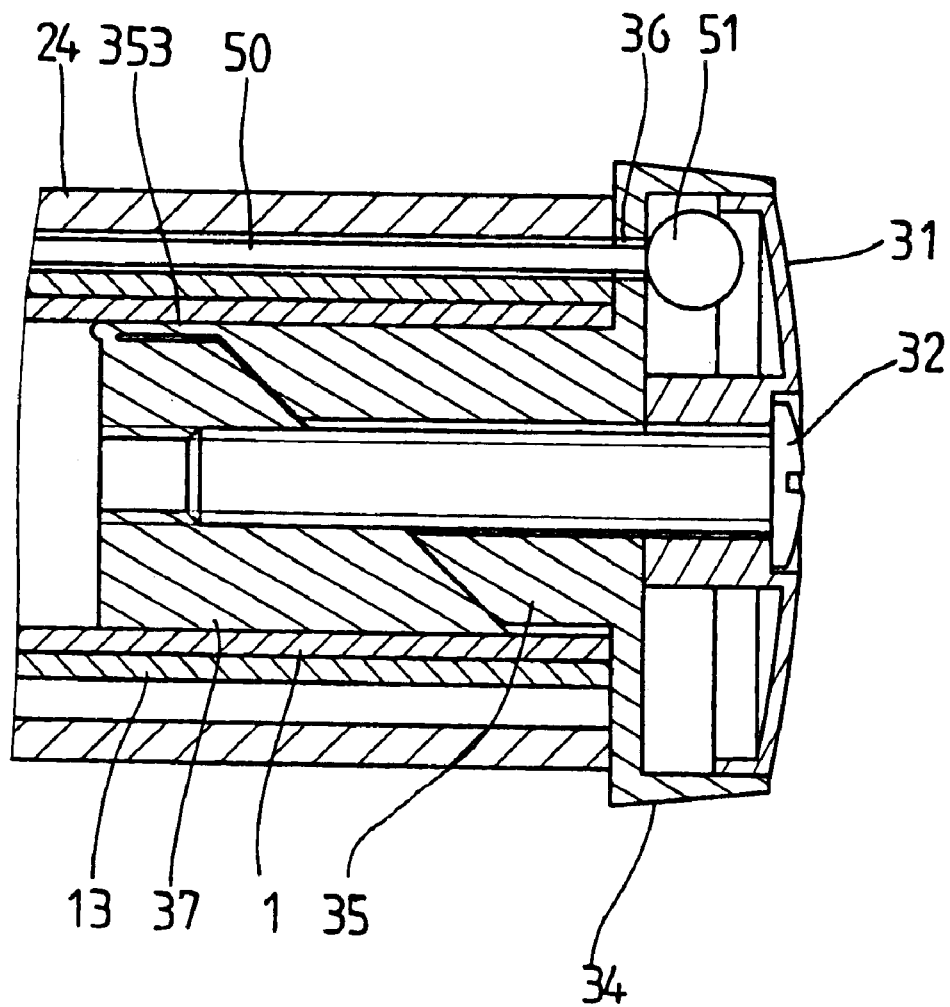
FIG. 6 shows a sectional view of a portion taken along the direction indicated by a line C—C as shown in FIG. 3.
Figure 7:
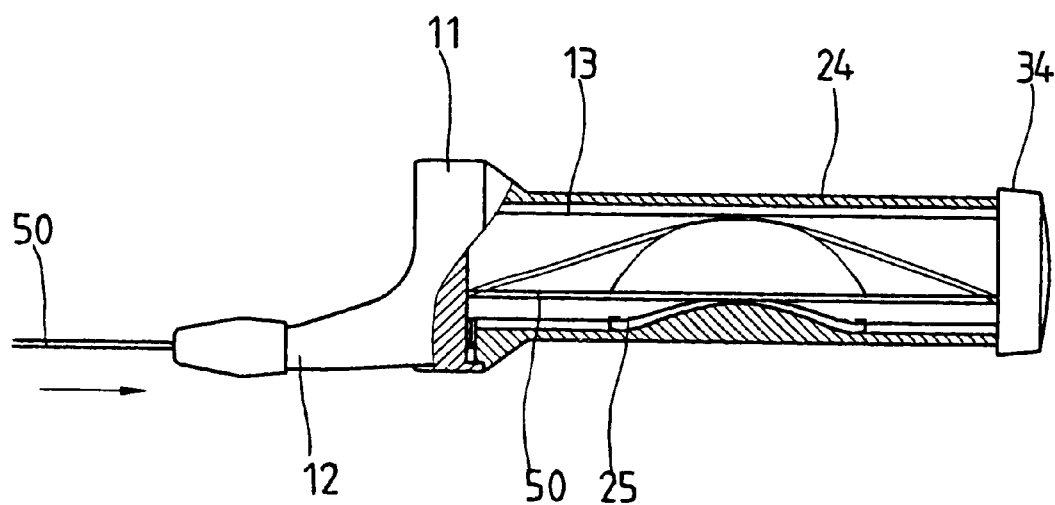
FIG. 7 shows a schematic view of the bicycle brake assembly of the present invention in operation.
Figure 8:
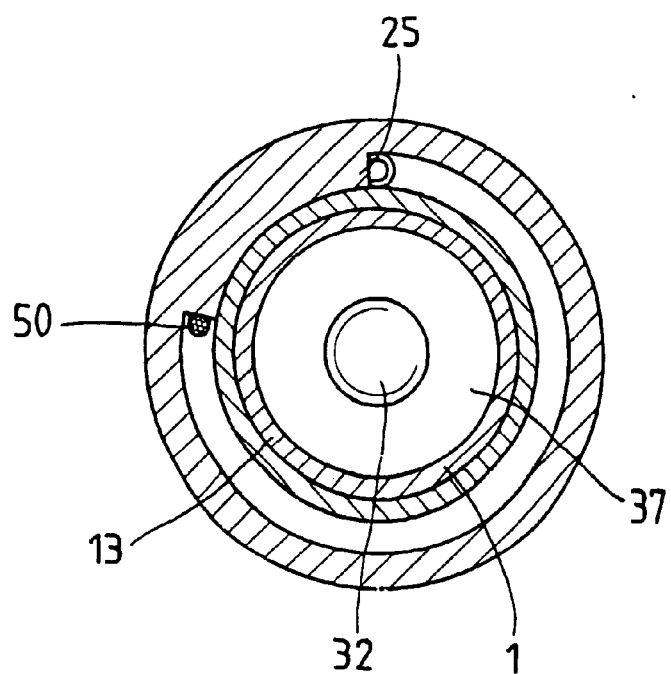
FIG. 8 shows another schematic view of the bicycle brake assembly of the present invention in operation.
Figure 9:
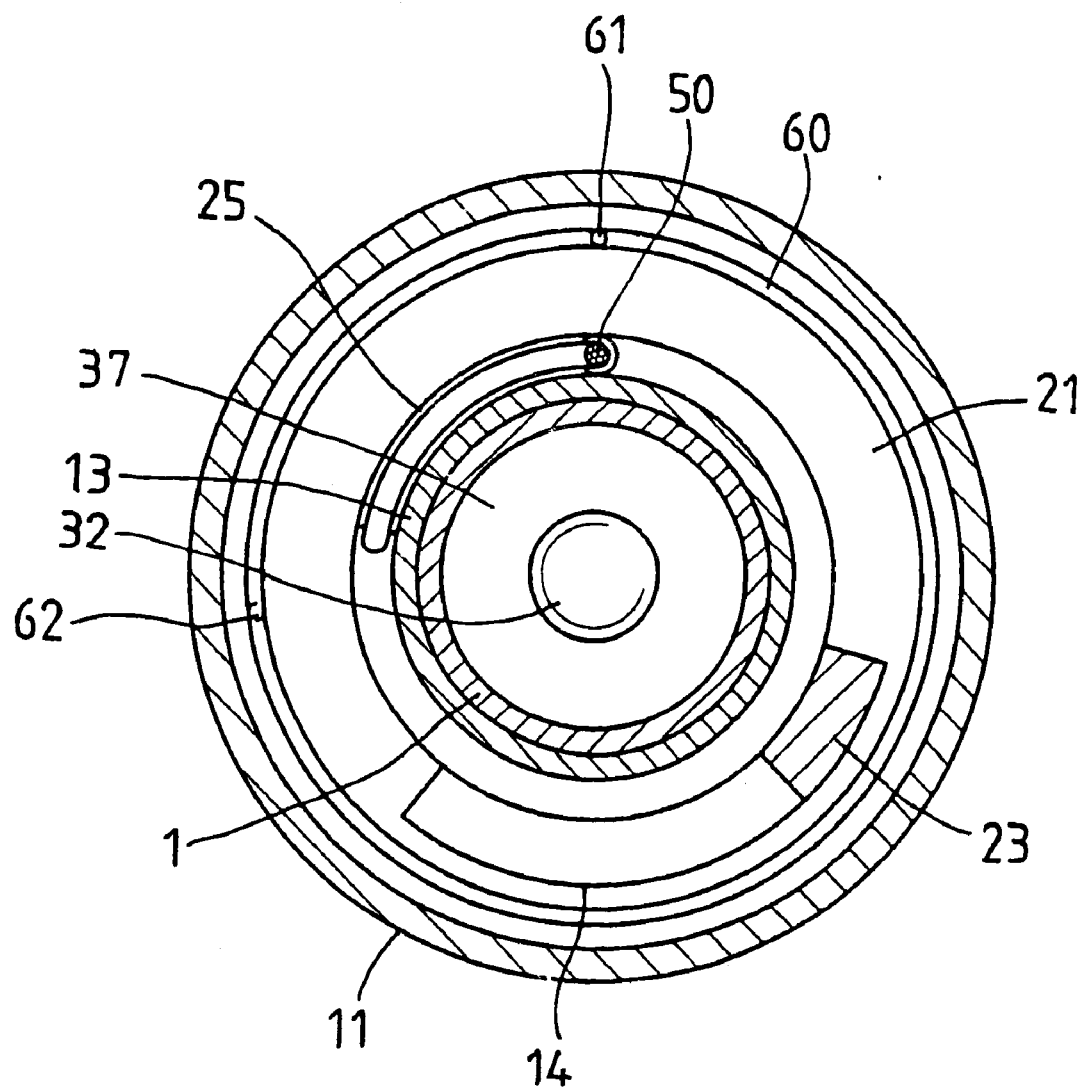
FIG. 9 shows still another schematic view of the bicycle brake assembly of the present invention in operation.

As shown in FIGS. 2–8, a bicycle brake assembly embodied in the present invention is composed of a locating member 10, a rotary handlebar 20, and a cap member 30.

The locating member 10 has a circular enlarged portion 11 and a cable guide portion 12 opposite in location to the circular enlarged portion 11, which is provided with an inner circular slot 111, a shaft tube 13, an arcuate guide slot 14, and a through hole 15 in communication with the hollow interior of the cable guide portion 12. The inner circular slot 111 is provided in the inner wall thereof with a retaining hook 16.

The rotary handlebar 20 has an enlarged circular end 21 provided with a retaining groove 22 and an arresting block 23. The rotary handlebar 20 is engaged at one end thereof with the locating member 10 such that the enlarged circular end 21 of the rotary handlebar 20 is received in the inner circular slot 111 of the locating member 10, and that the arresting block 23 of the enlarged circular end 21 of the rotary handlebar 20 is located in the arcuate guide slot 14, and further that a grip tube 24 of the rotary handlebar 20 is fitted over the shaft tube 13 of the locating member 10. As a result, a handlebar tube 1 of the bicycle is located in the shaft tube 13 of the locating member 10. The grip tube 24 of the rotary handlebar 20 is provided in the inner wall thereof with a protruded block 25 capable of making contact with a brake cable 50 at such time when the rotary handlebar 20 is rotated.

The cap member 30 is composed of an outer body 31 and an inner body 33. The out body 31 and the inner body 33 are fastened by a fastening bolt 32. The inner body 33 is provided with an enlarged portion 34 having a locating block 35 facing the handlebar tube 1 of the bicycle. The inner body 33 is further provided with a through hole 36 for receiving the brake cable 50 such that a locating end 51 of the brake cable 50 is located. The locating block 35 of the enlarged portion 34 of the inner body 33 is provided with an inclined plane 351 having a pliable portion 353 extending from the edge of the inclined plane 351 such that the pliable portion 353 is connected with an inclined block 37. The inclined block 37 has a guide inclined plane 371. The inclined block 37 can be adjusted such that the guide inclined plane 371 is parallel to the inclined plane 351 of the locating block 35, so as to enable the locating block 35 of the inner body 33 and the inclined block 37 to be received in the handlebar tube 1 of the bicycle such that the guide inclined plane 371 can be actuated to slide on the inclined plane 351 of the locating block 35 by rotating the fastening bolt 32, and that the inclined block 37 is actuated by the fastening bolt 32 to press against the interior of the handlebar tube 1 of the bicycle.

The present invention is further composed of an elastic ring 60, which is located between the inner circular slot 111 of the locating member 10 and the enlarged circular end 21 of the rotary handlebar 20 such that a first rotary arm 61 of the elastic ring 60 is in contact with the inner circular slot 111, and that a second rotary arm 62 of the elastic ring 60 is in contact with the enlarged circular end 21. The elastic ring 60 is intended to provide the rotary handlebar 20 with an elastic force enabling the rotary handlebar 20 to return to its original position.

The braking action is effected by rotating the rotary handlebar 20 to cause the protruded block 25 to trigger the brake cable 50. In addition, the brake cable 50 can be easily replaced by disengaging the bolt 32 with the cap member 30 so as to enable the outer body 31 to be removed to facilitate the replacing of the brake cable 50. It must be noted here that the brake cable 50 is received in the grip tube 24 of the rotary handlebar 20 via the through hole 15 of the locating member 10.

The embodiment of the present invention described above is to be deemed in all respects as being merely illustrative and not restrictive. Accordingly, the present invention may be embodied in other specific forms without deviating from the spirit thereof. The present invention is therefore to be limited only by the scope of the following appended claim.

What is claimed is:

1. A bicycle brake assembly comprising:

a locating member having a circular enlarged portion and a cable guide portion opposite in location to said circular enlarged portion, said circular enlarged portion provided with an inner circular slot, a shaft tube, an arcuate guide slot, and a through hole in communication with a hollow interior of said cable guide portion for receiving a bicycle brake cable;

a rotary handlebar having an enlarged circular end provided with a retaining groove and an arresting block, said rotary handlebar being engaged with said locating member such that said enlarged circular end of said rotary handlebar is received in said inner circular slot of said locating member, and that said arresting block of said enlarged circular end of said rotary handle bar is located in said arcuate guide slot of said locating member, and further that a grip tube of said rotary handlebar is fitted over said shaft tube of said locating member, said grip tube provided in an inner wall thereof with a protruded block capable of triggering the bicycle brake cable at such time when said rotary handlebar is rotated;

a cap member composed of an outer body, an inner body, and a fastening bolt engaged with said outer body and said inner body, said inner body provided with an enlarged portion having a locating block and further provided with a through hole for receiving the bicycle brake cable, said locating block of said enlarged portion of said inner body provided with an inclined plane having a pliable portion extending therefrom such that said pliable portion is in contact with an inclined block having a guide inclined plane which is actuatable by said fastening bolt to slide on said inclined plane of said locating block; and an elastic ring having a first rotary arm and a second rotary arm, said elastic ring being located between said inner circular slot of said locating member and said enlarged circular end of said rotary handlebar such that said first rotary arm of said elastic ring is in contact with said inner circular slot, and that said second rotary arm of said elastic ring is in contact with said enlarged circular end, thereby providing said rotary handlebar with an elastic force for said rotary handlebar to return to an original position thereof after being rotated.

* * * * *